US007957943B2

(12) United States Patent
Torres

(10) Patent No.: US 7,957,943 B2
(45) Date of Patent: Jun. 7, 2011

(54) METHOD AND SYSTEM FOR MODELING EFFECTS VISUALLY

(75) Inventor: Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 11/869,073

(22) Filed: Oct. 9, 2007

(65) Prior Publication Data

US 2009/0094008 A1    Apr. 9, 2009

(51) Int. Cl.
*G06G 7/48*    (2006.01)
(52) U.S. Cl. .......................................................... 703/6
(58) Field of Classification Search ........................ 703/6
See application file for complete search history.

(56) References Cited

U.S. PATENT DOCUMENTS 5,040,131 A      8/1991    Torres
5,890,131 A *    3/1999    Ebert et al. ........................ 705/7
7,139,739 B2     11/2006   Agrafiotis et al.

OTHER PUBLICATIONS

Northwest Controlling Corporation, PathMaker "Software to manage improvement projects", 2004, 22 pages.*

"Force Field Artatysis", Accel-Team, 2007, pp. 1-3, retrieved Jul. 26 2007. http://www.accel-team.com/techniques/force_field_analysis.html.
"Force Field Analysis", Mind Tools Ltd., 2007, pp. 1-8, retrieved Jul. 26 2007. http://www.mindtools.com/pages/article/newTED_06.htm.
"Tree Diagram", SkyMark Corporation, 2007, pp. 1-3. retrieved Jul. 26 2007. http://www.skymark.com/resources/tools/tree%20diagram.asp.

* cited by examiner

*Primary Examiner* — David Silver
(74) *Attorney, Agent, or Firm* — Yee and Associates, PC; Mark C. Vallone

(57) ABSTRACT

A system for defining the effect of forces on a model. The model is displayed and the model includes a goal axis and an equilibrium line. A plurality of qualitative effects are added to the equilibrium line. Each of the added qualitative effects apply a force to the equilibrium line. A qualitative strength and a quantitative strength are assigned to one or more of the added qualitative effects. The equilibrium line is bent in a positive and a negative direction based on an amount and a direction of force applied to the equilibrium line by each of the added qualitative effects. Also, the equilibrium line is moved in a positive or a negative direction along a goal axis based on a net effect of forces applied to the equilibrium line by the added qualitative effects. In addition, the model as effected by the added qualitative effects is saved to storage.

20 Claims, 11 Drawing Sheets

METHOD AND SYSTEM FOR MODELING EFFECTS VISUALLY

BACKGROUND OF THE INVENTION

1. Field of the Invention

The present invention relates generally to an improved data processing system. More specifically, the present invention is directed to a computer implemented method, system, and computer usable program code for automatically modeling the effect of driving and restraining forces toward one or more desired goals on a force field analysis diagram.

2. Description of the Related Art

Force field analysis is a management technique that takes into consideration all the forces for and all the forces against a particular change in a current situation. In any situation there are both driving forces and restraining forces that influence any change that may occur. Driving forces are those forces that push toward a desired change, such as increased productivity for an enterprise. Restraining forces are those forces that act to prevent or restrict the desired change, such as out-of-date equipment within an enterprise desiring increased productivity.

In a force field analysis, an individual places driving forces for change on one side of the diagram, while placing restraining forces against the change on the opposite side of the diagram. Then, the individual may assign a score or value to each of the driving and restraining forces in the diagram to demonstrate the actual or perceived impact that each of these forces have on the desired change. Equilibrium is reached when the sum of the driving forces equals the sum of the restraining forces.

By carrying out a force field analysis, an entity, such as an individual or an enterprise, may plan to strengthen the forces supporting a decision for change and lessen the impact of forces opposing the change. In addition, using force field analysis, the entity may determine whether a project for change is viable or not. Further, if the decision to proceed with the project for change has already been made, then the entity may use the force field analysis to identify forces that may improve the project's probability of success.

Currently, force field analysis applications only allow an individual to define a force for or against a change with limited capabilities, such as assigning a quantitative value to a driving or restraining force. However, this current force field analysis technique is limited in that complex quantitative models cannot be defined or compared.

Therefore, it would be beneficial to have an improved computer implemented method, system, and computer usable program code for automatically and dynamically defining the effect of a plurality of driving and restraining forces toward one or more desired goals on a force field analysis diagram.

SUMMARY OF THE INVENTION

Illustrative embodiments provide a computer implemented method, system, and computer usable program code for defining the effect of forces on a model. The model is displayed and the model includes a goal axis and an equilibrium line. A plurality of qualitative effects are added to the equilibrium line. Each of the added qualitative effects apply a force to the equilibrium line. A qualitative strength is assigned to one or more of the added qualitative effects and a quantitative strength is assigned to one or more of the added qualitative effects. Then, the equilibrium line is bent in a positive direction and in a negative direction based on an amount of force and a direction of force applied to the equilibrium line by each of the added qualitative effects. In addition, the equilibrium line is moved in the positive direction or in the negative direction along a goal axis based on a net effect of forces applied to the equilibrium line by the added qualitative effects. Also, the model as effected by the added qualitative effects is saved to storage.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
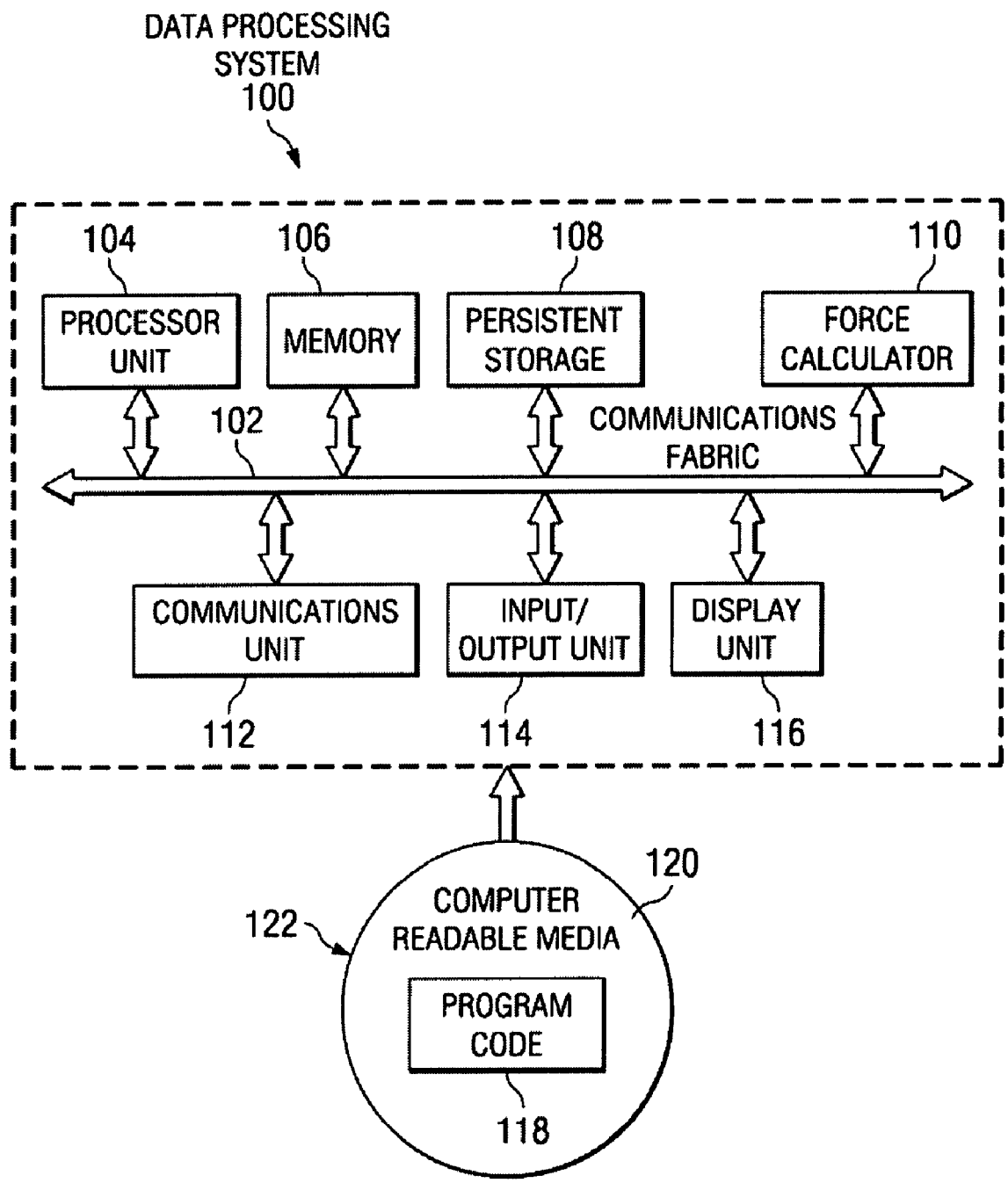
FIG. 1 is a diagram of a data processing system in which illustrative embodiments may be implemented.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

FIG. 1 depicts a diagram of a data processing system in which illustrative embodiments may be implemented. In this illustrative example, data processing system 100 includes communications fabric 102, which provides communications between processor unit 104, memory 106, persistent storage 108, force calculator unit 110, communications unit 112, input/output (I/O) unit 114, and display unit 116.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory (RAM). Persistent storage 108 may take various forms depending on the particular implementation. For example, persistent storage 108 may contain one or more components or devices, such as a hard drive, a flash memory, a rewritable optical disk, a rewritable magnetic tape, or some combination of the above. The media used by persistent storage 108 also may be removable. For example, a removable hard drive may be used for persistent storage 108.

Force calculator 110 is a component that automatically and dynamically calculates the effect of a plurality of forces on an equilibrium line toward or away from one or more desired goals in a force field analysis diagram application. In addition, force calculator 110 may compare force analysis models to determine which model provides a better result. Moreover, force calculator 110 may integrate or combine a plurality of force analysis models to form a more complex and comprehensive force analysis model for analysis.

It should be noted that force calculator 110 may be implemented entirely as software, entirely as hardware, or as a combination of both software and hardware. Further, a user may enable and disable force calculator 110 independently of other data processing system 100 features and components.

Communications unit 112, in these examples, provides for communications with other data processing systems or devices. In these examples, communications unit 112 is a network interface card. Communications unit 112 may provide communications through the use of either or both physical and wireless communications links.

Input/output unit 114 allows for input and output of data with other devices that may be connected to data processing system 100. For example, input/output unit 114 may provide a connection for user input through a keyboard and mouse. Further, input/output unit 114 may send output to a printer. Display unit 116 provides a mechanism to display information to a user.

Instructions for an operating system and applications or programs are located on persistent storage 108. These instructions may be loaded into memory 106 for execution by processor unit 104. The processes of different illustrative embodiments may be performed by processor unit 104 using computer implemented instructions, which may be located in a memory, such as memory 106. These instructions are referred to as, program code, computer usable program code, or computer readable program code that may be read and executed by a processor in processor unit 104. The program code in the different illustrative embodiments may be embodied on different physical or tangible computer readable media, such as memory 106 or persistent storage 108.

Program code 118 is located in a functional form on computer readable media 120 and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive or a flash memory that is connected to data processing system 100. The tangible form of computer readable media 120 is also referred to as computer recordable storage media.

Alternatively, program code 118 may be transferred to data processing system 100 from computer readable media 120 through a communications link to communications unit 112 and/or through a connection to input/output unit 114. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different illustrative embodiments may be implemented. The different illustrative embodiments may be implemented in a data processing system including components in addition to, or in place of, those illustrated for data processing system 100. Other components shown in FIG. 1 may be varied from the illustrative examples shown.

For example, a bus system may be used to implement communications fabric 102 and may comprise one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache, such as found in an interface and memory controller hub, which may be present in communications fabric 102.

Illustrative embodiments provide a computer implemented method, system, and computer usable program code for defining the effect of forces on a model. The forces are driving and restraining forces that effect a desired change in a modeled system. The model is a force field analysis diagram.

A force field analysis component displays the force field analysis diagram in a window. The force field analysis diagram includes a goal axis and an equilibrium line. A user adds a plurality of qualitative effects, which define a plurality of driving and restraining forces, onto the equilibrium line. Each of the added qualitative effects apply a force to the equilibrium line.

The user may then assign a qualitative strength to one or more of the added qualitative effects. In addition, the user may also assign a quantitative strength to one or more of the added qualitative effects. The force field analysis component automatically bends the equilibrium line in a positive direction and in a negative direction based on an amount of force and a direction of force that is applied to the equilibrium line by each of the added qualitative effects. Further, the force field analysis component moves the equilibrium line in a positive direction or in a negative direction along a goal axis based on a net effect of forces applied to the equilibrium line by the added qualitative effects. When the user provides an input to close the force field analysis application, the force field analysis component saves the force field analysis diagram, as effected by the added qualitative effects, in an appropriate file in persistent storage.

Illustrative embodiments not only provide the basic capabilities of a force field analysis technique, but also include the capabilities of visual and modeling techniques. These capabilities include: 1) providing a goal axis and an anchor point for the current qualitative state; 2) providing a visual marker for the desired qualitative end state, such as, for example, a set goal; 3) visually assigning and representing the strength of each force applied in the model, such as with the width and length of the force arrows; 4) visually showing the effect of each force on the equilibrium line, such as, for example, bending the equilibrium line in a positive or a negative direction depending upon the direction and strength of each force; 5) visually showing the net effect of all forces on the equilibrium line, such as, for example, moving the equilibrium line in a positive or a negative direction along a goal axis; 6) providing a mechanism to assign variable values to forces, such as, for example, $X^2$, external input data sources, and variable taxonomies, in addition to assigning static force values; and 7) providing a quantitative goal marker for the model.

As values are assigned to each force, a composite modeling algorithm is formulated and mapped to the present goal value of the force field analysis diagram. Illustrative embodiments also include comparing two or more models to determine which model performs best and integrating multiple models to form a more complex model. The modeling algorithms may be calibrated and validated in more complex analyses using data. However, this extended force field analysis modeling tool is useful for migrating qualitative analyses to more structured and analytic techniques.

A user may begin a force field analysis using an illustrative embodiment with a model template, an existing model, or from scratch. Illustrative embodiments utilize graphical user interface (GUI) methods for a user to drag and drop forces on the equilibrium line and assign direction, strength, and potentially other variables, such as cost, duration, etc., to the forces in the model. As a user gains more knowledge, goals may be placed on the force field analysis diagram to depict how much progress is being made. In addition, the user may assign quantitative values or input sources. As a result, the qualitative model becomes more quantitative over time. Consequently, illustrative embodiments create a multi-dimensional quantitative model from a multi-dimensional qualitative model that includes a plurality of variables.

Figure 2:
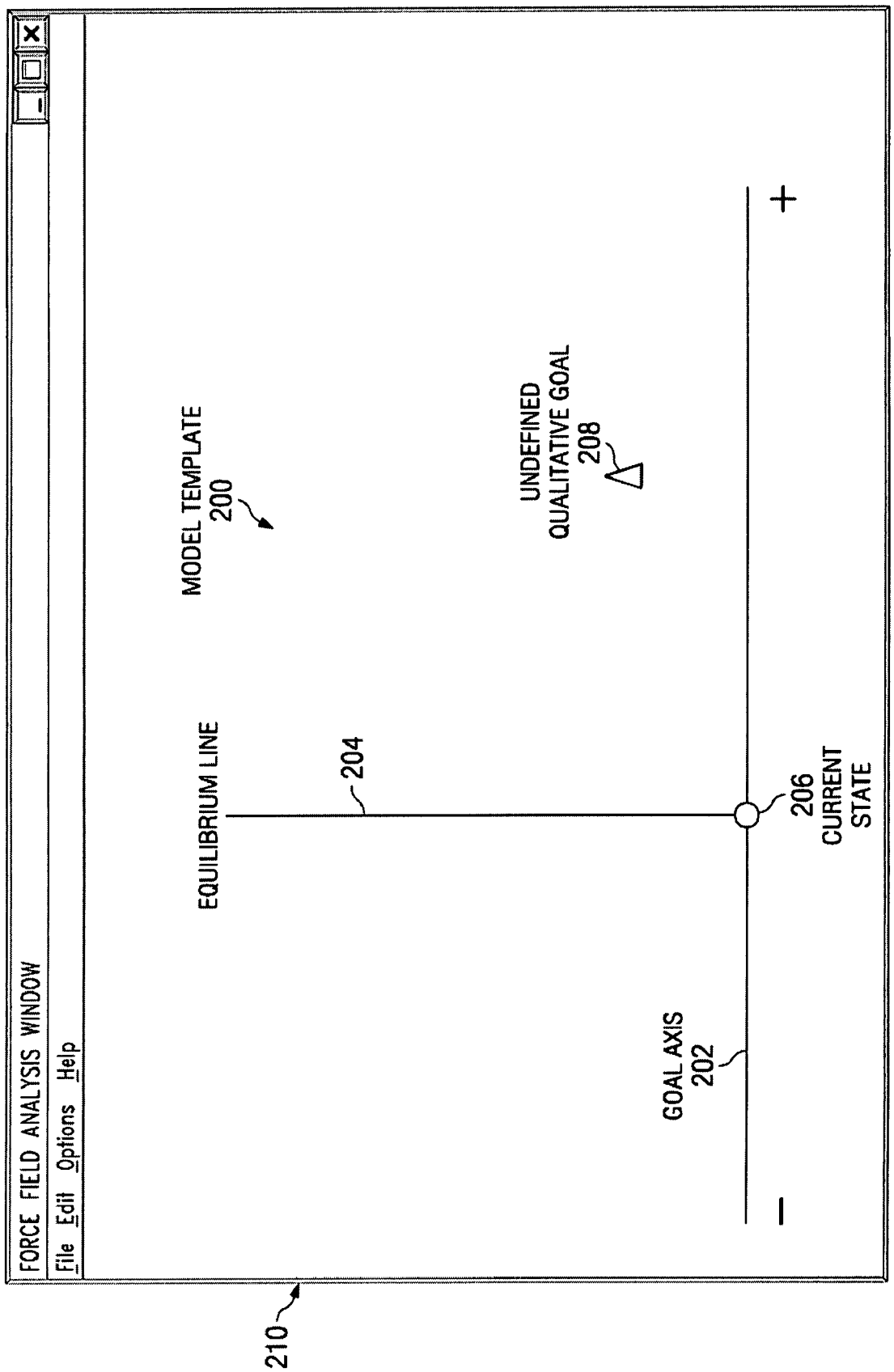
FIG. 2 is an exemplary illustration of a model template in accordance with an illustrative embodiment.

With reference now to FIG. 2, an exemplary illustration of a model template is depicted in accordance with an illustrative embodiment. Model template 200 is a template for modeling a force field analysis of a system. A user may use model template 200 to create a new force field analysis for the system to be modeled.

Model template 200 includes goal axis 202, equilibrium line 204, current state 206, and undefined qualitative goal 208. Goal axis 202 is the axis that represents the dependent variables of the system being modeled, such as, for example, profit, cost, etc. Equilibrium line 204 is the axis that represents equilibrium between driving and restraining forces for a desired change. In addition, equilibrium line 204 is the axis which force effects of independent variables are applied to and which result in movement of the system model results toward or away from the desired end state or the "to be" state.

Current state 206 is the current state of the model "as is" without change and may serve as an anchor point on goal axis 202 for the model. The "as is" performance or characteristics of the dependent variables of the system being modeled should move toward the desired or "to be" state, which may be defined by a qualitative goal and/or a quantitative goal along goal axis 202, as forces are applied to equilibrium line 204. Undefined qualitative goal 208 is a presently undefined goal marker. A qualitative goal is an objective with a desired end point, but without a measurable criterion, such as, for example, increasing profits of an enterprise.

A force field analysis component, such as force calculator 110 in FIG. 1, may utilize a window, such as force field analysis window 210, to display model template 200. However, it should be appreciated by those of ordinary skill in the art that even though the force field analysis component displays model template 200 in a two dimensional format in this illustrative example, the force field analysis component may display model template 200, or an existing model, in a three dimensional format as well based upon application settings and/or user input. Further, the force field analysis component may rotate model template 200 or an existing model around the x, y, and z axis based on user input. In addition, the force field analysis component may utilize a display unit, such as display unit 116 in FIG. 1, to display force field analysis window 210 to a user.

Figure 3:
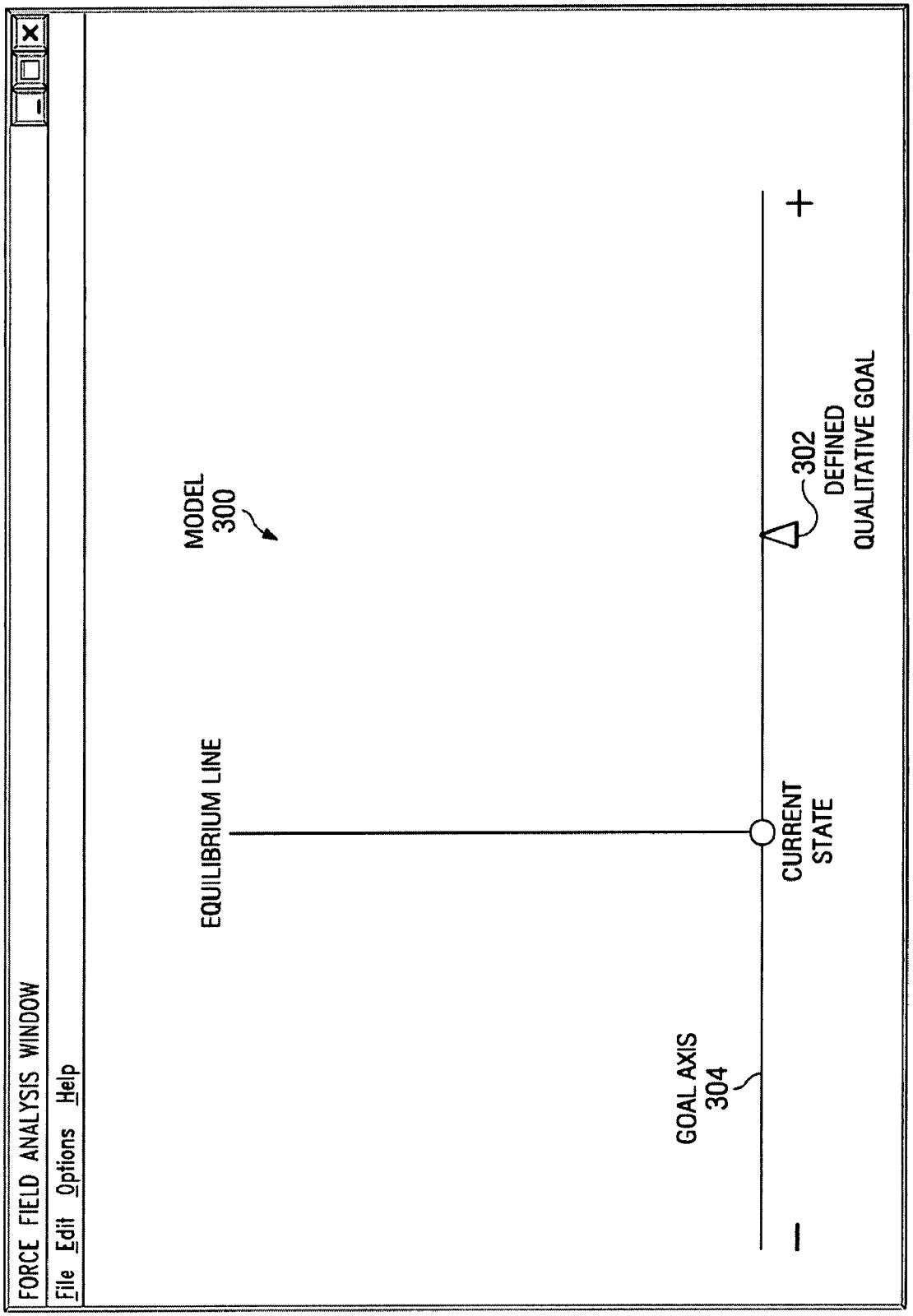
FIG. 3 is an exemplary illustration of assigning a qualitative goal to a model in accordance with an illustrative embodiment.

With reference now to FIG. 3, an exemplary illustration of assigning a qualitative goal to a model is depicted in accordance with an illustrative embodiment. Model 300 may be implemented in model template 200 in FIG. 2. Model 300 includes defined qualitative goal 302 on goal axis 304. Defined qualitative goal 302 may, for example, be previously undefined qualitative goal 208 in FIG. 2. Defined qualitative goal 302 is a goal marker and represents a desired end point for the system to be modeled in model 300. The desired end point for defined qualitative goal 302 may, for example, be improved productivity, increased customer satisfaction, increased market share, or reduced costs for an enterprise.

Figure 4:
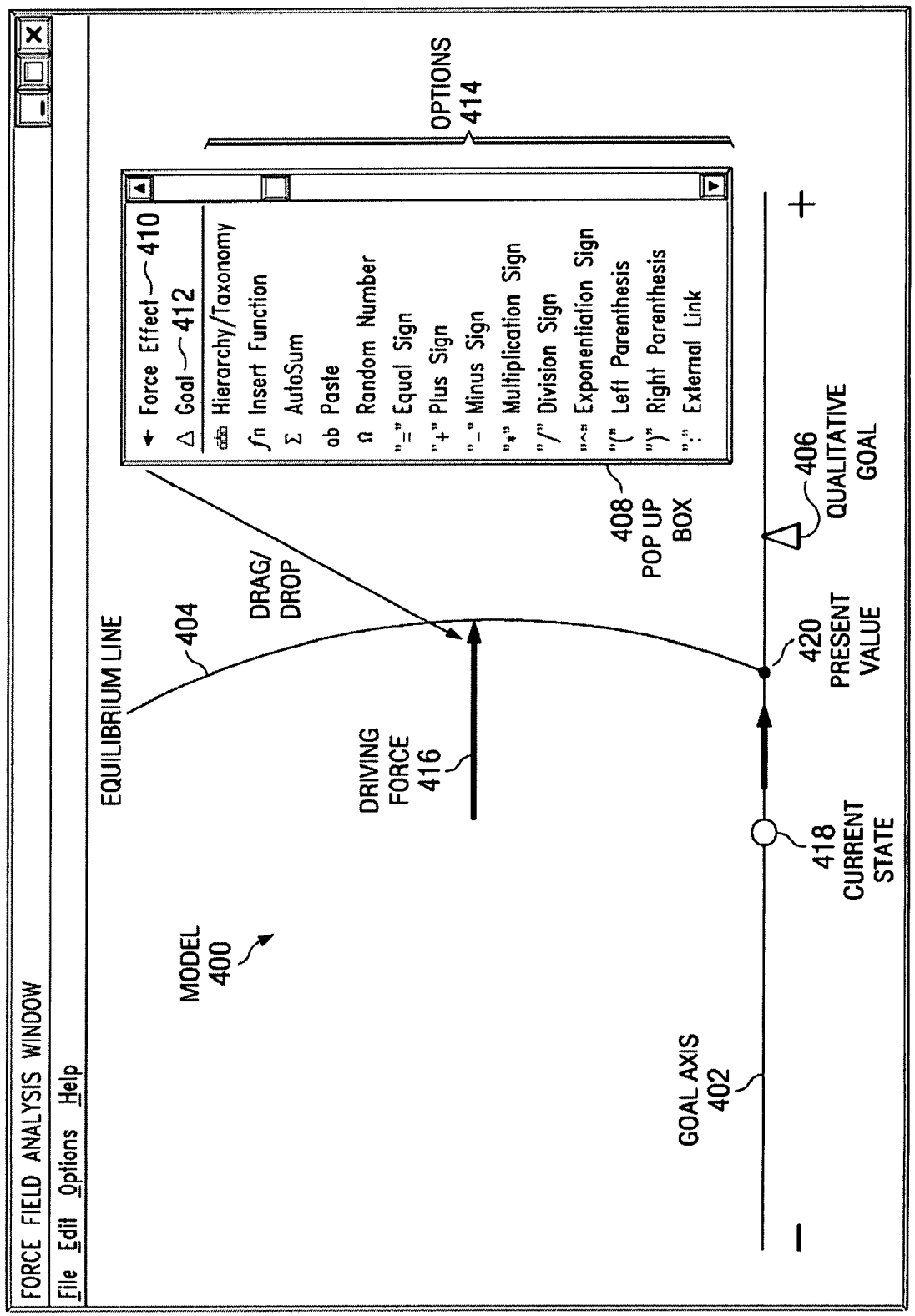
FIG. 4 is an exemplary illustration of applying a force effect line to a model in accordance with an illustrative embodiment.

With reference now to FIG. 4, an exemplary illustration of applying a force effect line to a model is depicted in accordance with an illustrative embodiment. Model 400 may, for example, be model 300 in FIG. 3. Model 400 includes goal axis 402, equilibrium line 404, qualitative goal 406, and popup box 408.

Popup box 408 is an adjustable, movable display box that pops open within the window, such as force field analysis window 210 in FIG. 2, in response to a user input to open model 400. However, it should be noted that popup box 408 may instead represent a persistent pane within the window. Alternatively, popup box 408 may represent a drop down menu from the menu bar.

A user employs popup box 408 to add force effect lines, goals, functions, and other features to model 400. The user may utilize a mouse, for example, to click on, drag, and drop a force effect line, goal, function, or other feature within popup box 408 onto model 400. Popup box 408 includes force effect line 410, goal marker 412, and options 414. However, it should be noted that popup box 408 is only shown for illustration purposes and is not intended as a limitation to illustrative embodiments. In other words, popup box 408 may include more or fewer functions and features in accordance with alternative illustrative embodiments.

The user may utilize force effect line 410 to define a plurality of driving forces and restraining forces within model 400. In this illustrative example, the user drags and drops force effect line 410 onto equilibrium line 404 to define driving force 416. The arrow representing driving force 416 may, for example, be of a default size and shape. After the user drags and drops force effect line 410 onto equilibrium line 404, a force field analysis component, such as force calculator 110 in FIG. 1, automatically calculates the effect of the force and moves equilibrium line 404 in an appropriate direction, which may either be in a positive direction or a negative direction from current state 418. The force field analysis component may, for example, use a movement algorithm to determine how far to bend and how far to move equilibrium line 404.

However, it should be noted that the user may manually manipulate equilibrium line 404 as needed. For example, the user may drag equilibrium line 404 via a mouse click in a positive or a negative direction along goal axis 402 as the user desires. Then, as a result of the manual manipulation of equilibrium line 404 by the user, the force field analysis component automatically adjusts the model, which includes the added force effects, based on the manual changes.

In this illustrative example, the force field analysis component bends equilibrium line 404 in a positive direction and moves equilibrium line 404 along goal axis 402 toward qualitative goal 406 to present value 420 as a result of the effect of driving force 416 on the modeled system. Present value 420 is the value of the present performance or characteristics of the system as the force field component automatically applies the effect of one or more forces to the model's equilibrium line.

The user may utilize goal marker 412 to define one or more goals along goal axis 402. In addition to defining qualitative goal 406, the user may use goal marker 412 to define a quantitative goal. A quantitative goal is an objective with a desired end point, along with a measurable criterion, such as, for example, increasing profits of an enterprise by ten percent. The user may utilize options 414 to assign a function, such as a hierarchy or taxonomy (e.g., an organization chart), a random number, a mathematical sign (e.g., plus, minus, multiplication, division, and equal), or an external link (e.g., other statistical or analytical models imported from an external source, the Internet, or other external sources of information), to one or more driving or restraining forces.

Figure 5:
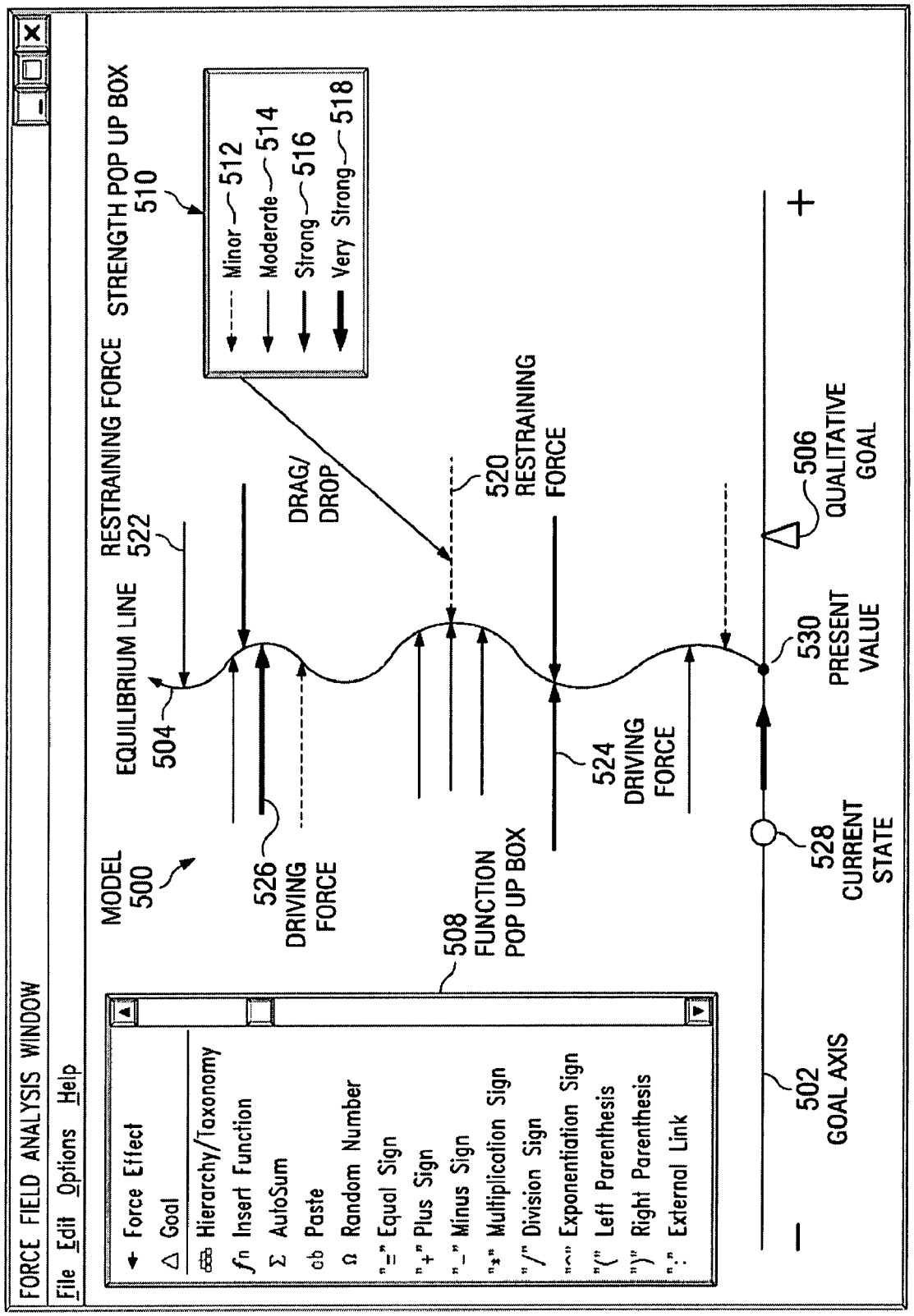
FIG. 5 is an exemplary illustration of adding multiple forces to a model and applying qualitative strength to the multiple forces in accordance with an illustrative embodiment.

With reference now to FIG. 5, an exemplary illustration of adding multiple forces to a model and applying qualitative strength to the multiple forces is depicted in accordance with an illustrative embodiment. Model 500 may, for example, be an extension of model 400 in FIG. 4. Model 500 includes goal axis 502, equilibrium line 504, qualitative goal 506, function popup box 508, and strength popup box 510.

A user utilizes function popup box 508, such as popup box 408 in FIG. 4, to add a plurality of force effect lines onto equilibrium line 504. The plurality of force effect lines define the driving and restraining forces on the modeled system. Driving forces are on the left side of equilibrium line 504. Driving forces tend to bend and move equilibrium line 504 in a positive direction, which is toward qualitative goal 506. Restraining forces are on the right side of equilibrium line 504. Restraining forces tend to bend and move equilibrium line 504 in a negative direction, which is away from qualitative goal 506.

As the user adds the driving and restraining forces to equilibrium line 504, a force field analysis component, such as force calculator 110 in FIG. 1, automatically calculates the effect of each added force and automatically adjusts equilibrium line 504 accordingly. In other words, the force field analysis component bends and moves equilibrium line 504 based on the calculated effect of each of the plurality of driving and restraining forces on the modeled system.

It should be noted that when the user originally places the plurality of force effect lines onto equilibrium line 504, the force effect lines represent a default force value. In other words, all of the force effect lines are the same size and shape and represent the same amount of force. However, after adding the force effect lines to equilibrium line 504 from function popup box 508, the user may utilize strength popup box 510 to assign a qualitative strength to one or more of the added force effect lines. Strength popup box 510 allows a user to individually assign how much qualitative force a driving or restraining force applies to equilibrium line 504 from the default value. In addition, the force field analysis component may present bench marks from previous and/or existing models to the user to provide guidance in assigning how much force a driving or restraining force should apply to equilibrium line 504.

Similar to popup box 408 in FIG. 4, strength popup box 510 may be an adjustable, movable display box that pops open within the window, a persistent pane within the window, or a drop down menu from the menu bar. The user may, for example, use a mouse to click on, drag, and drop an appropriate qualitative strength force indicator onto a particular driving or restraining force in order to assign that particular qualitative strength to that particular driving or restraining force. Strength popup box 510 includes minor force 512, moderate force 514, strong force 516, and very strong force 518. However, it should be noted that strength popup box 508 is only shown for illustration purposes and is not intended as a limitation to illustrative embodiments. In other words, strength popup box 508 may include more or fewer qualitative strength force indicators in accordance with alternative illustrative embodiments.

As examples in this depicted illustration, the user assigns restraining force 520 with a minor qualitative strength force indicator, restraining force 522 with a moderate qualitative strength force indicator, driving force 524 with a strong qualitative strength force indicator, and driving force 526 with a very strong qualitative strength force indicator. As a net result of the sum of all the driving and restraining forces on the modeled system, the force field analysis component automatically moves equilibrium line 504 in a positive direction toward qualitative goal 506 from current state 528 to present value 530. Further, the force field analysis component automatically adjusts and bends equilibrium line 504 to visually indicate the effect of the driving and restraining forces on equilibrium line 504.

Figure 6:
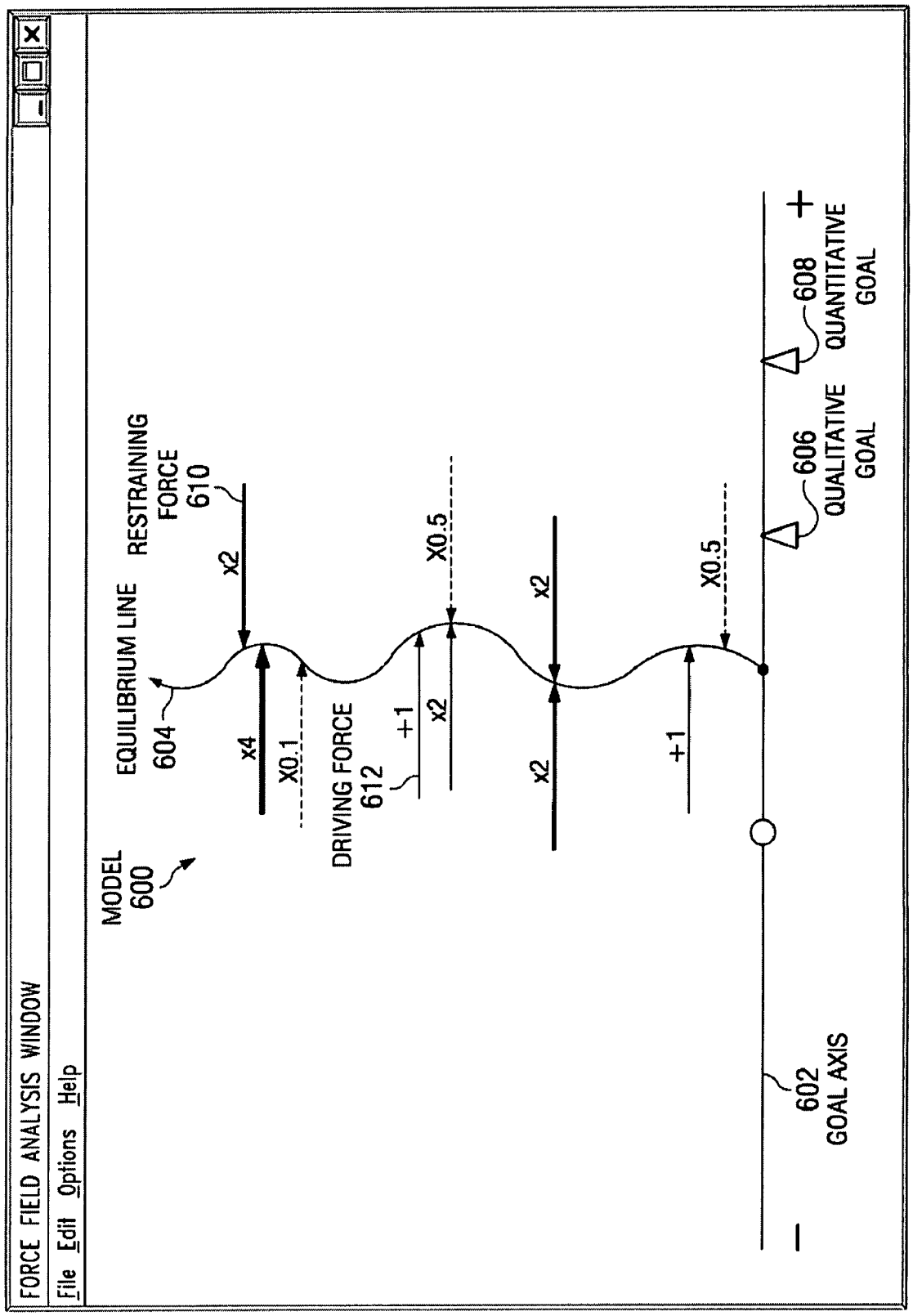
FIG. 6 is an exemplary illustration of assigning a quantitative goal and quantitative strength to a model in accordance with an illustrative embodiment.

With reference now to FIG. 6, an exemplary illustration of assigning a quantitative goal and quantitative strength to a model is depicted in accordance with an illustrative embodiment. Model 600 may, for example, be an extension of model 500 in FIG. 5. Model 600 includes goal axis 602, equilibrium line 604, qualitative goal 606, and quantitative goal 608.

Qualitative goal 606 may, for example, represent a goal of reducing cost for an enterprise. Quantitative goal 608 may, for example, represent the goal of reducing cost for the enterprise by ten percent. After defining qualitative goal 606 and quantitative goal 608 and assigning a qualitative strength to one or more of the driving and restraining forces applied to equilibrium line 606, a user may assign a quantitative strength to one or more of the driving and restraining forces. A quantitative strength is a constant numeric value by which driving and restraining forces are quantifiably increased or decreased depending upon the assigned sign and function. As examples in this depicted illustration, the user assigns a quantitative strength of times two to restraining force 610 and a quantitative strength of plus one to driving force 612.

Figure 7:
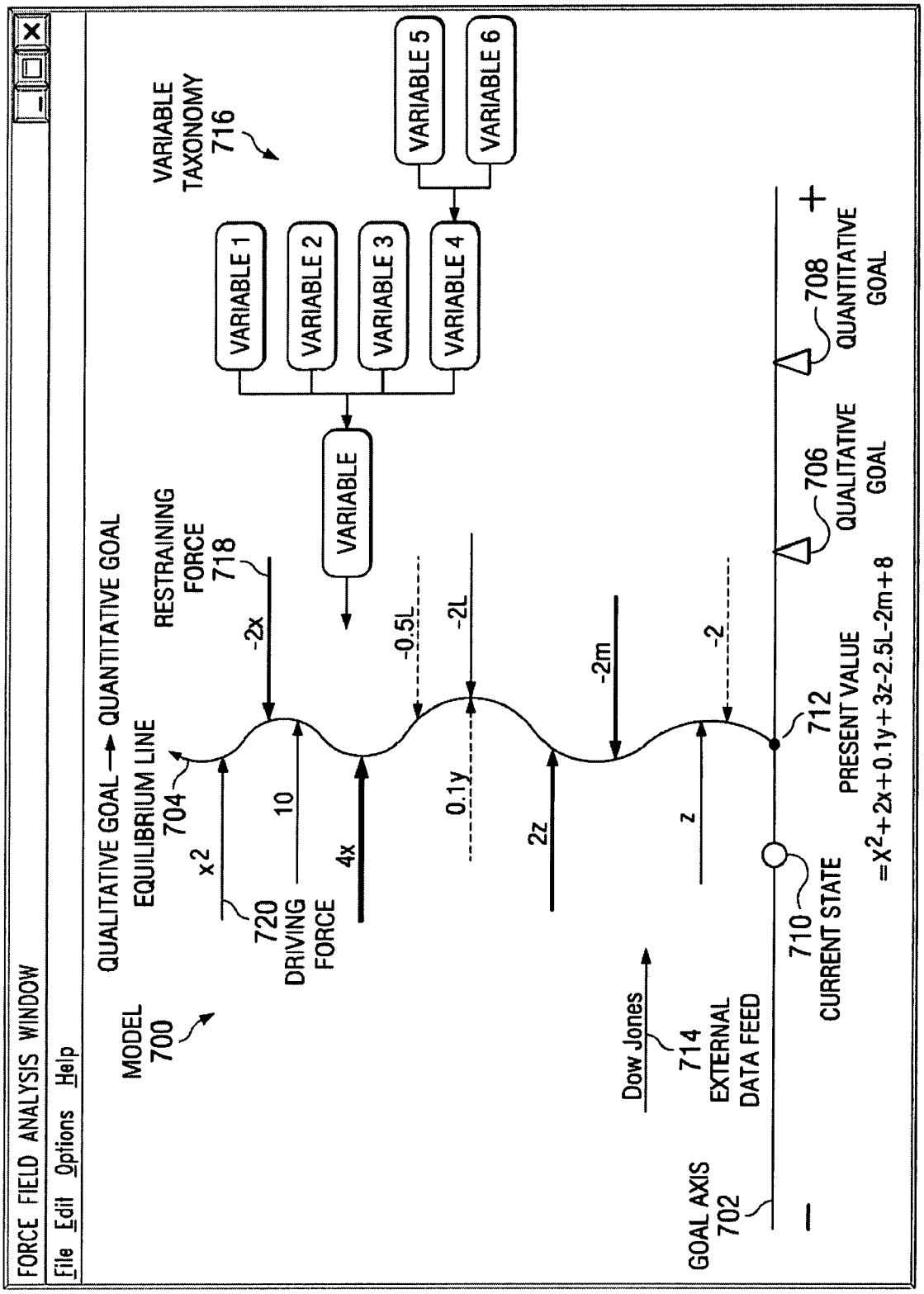
FIG. 7 is an exemplary illustration of assigning variable strength to a model in accordance with an illustrative embodiment.

With reference now to FIG. 7, an exemplary illustration of assigning variable strength to a model is depicted in accordance with an illustrative embodiment. Model 700 may, for example, be an extension of model 600 in FIG. 6. Model 700 includes goal axis 702, equilibrium line 704, qualitative goal 706, quantitative goal 708, current state 710, present value 712, external data feed 714, and variable taxonomy 716.

As examples in this depicted illustration, the user assigns a variable strength of minus 2x to restraining force 718 and a variable strength of $X^2$ to driving force 720. A variable strength is a changeable numeric value by which driving and restraining forces are increased or decreased depending upon the assigned sign and function. As the user assigns more quantitative strength and variable strength to the model, the model moves the qualitative goal toward a quantitative goal.

After summing the net effect of the assigned variable strengths in this illustrative example, a force field analysis component, such as force calculator 110 in FIG. 1, calculates present value 712 to be equal to $X^2+2x+0.1y+3z-2.5 L-2m+8$. As a result, the force field analysis component automatically moves equilibrium line 704 in a positive direction along goal axis 702 toward qualitative goal 706 and quantitative goal 708 from current state 710 to present value 712.

However, it should be noted that the user also adds external data feed 714 and variable taxonomy 716 as forces that effect the modeled system. In this illustrative example, external data feed 714 is a driving force and variable taxonomy 716 is a restraining force, both of which act upon equilibrium line 704. External data feed 714 and variable taxonomy 716 may, for example, be data sources that have frequently changing data and, therefore have a frequently changing effect on the amount of force that acts upon equilibrium line 704 at any given time. Consequently, the force field analysis component constantly monitors these frequently changing data sources for changes, dynamically recalculates the changing effect these sources have on equilibrium line 704 on the fly when changes occur, and adjusts equilibrium line 704 as needed based on the recalculated effect. Alternatively, the force field analysis component may monitor these frequently changing data sources on a predetermined time interval basis, such as, for example, once an hour, a day, every two day, a week, or a month.

External data feed 714 represents a data source that is external to the data processing system, such as data processing system 100 in FIG. 1. In this illustrative example, external data feed 714 represents a continuous data feed from the Dow Jones Industrial Average, which is one of several stock market indices. Because the stock market constantly, and sometimes violently, changes, data input into the model from this external data source may frequently change. As a result, the force field analysis component must automatically and dynamically adjust the effect of such forces on equilibrium line 704 accordingly.

Variable taxonomy 718 represents a hierarchical set of variables in a tree data structure. This hierarchical set of variables allows one or more sub-variables (child nodes) to feed data into a higher level variable (parent node). In turn, the root node of the hierarchical set of variables provides data input to model 700. Similar to the data in external data feed 714, the data in one or more of the variables in variable taxonomy 716 may frequently change requiring constant or intermittent data monitoring and force recalculation by the force field analysis component.

Figure 8:
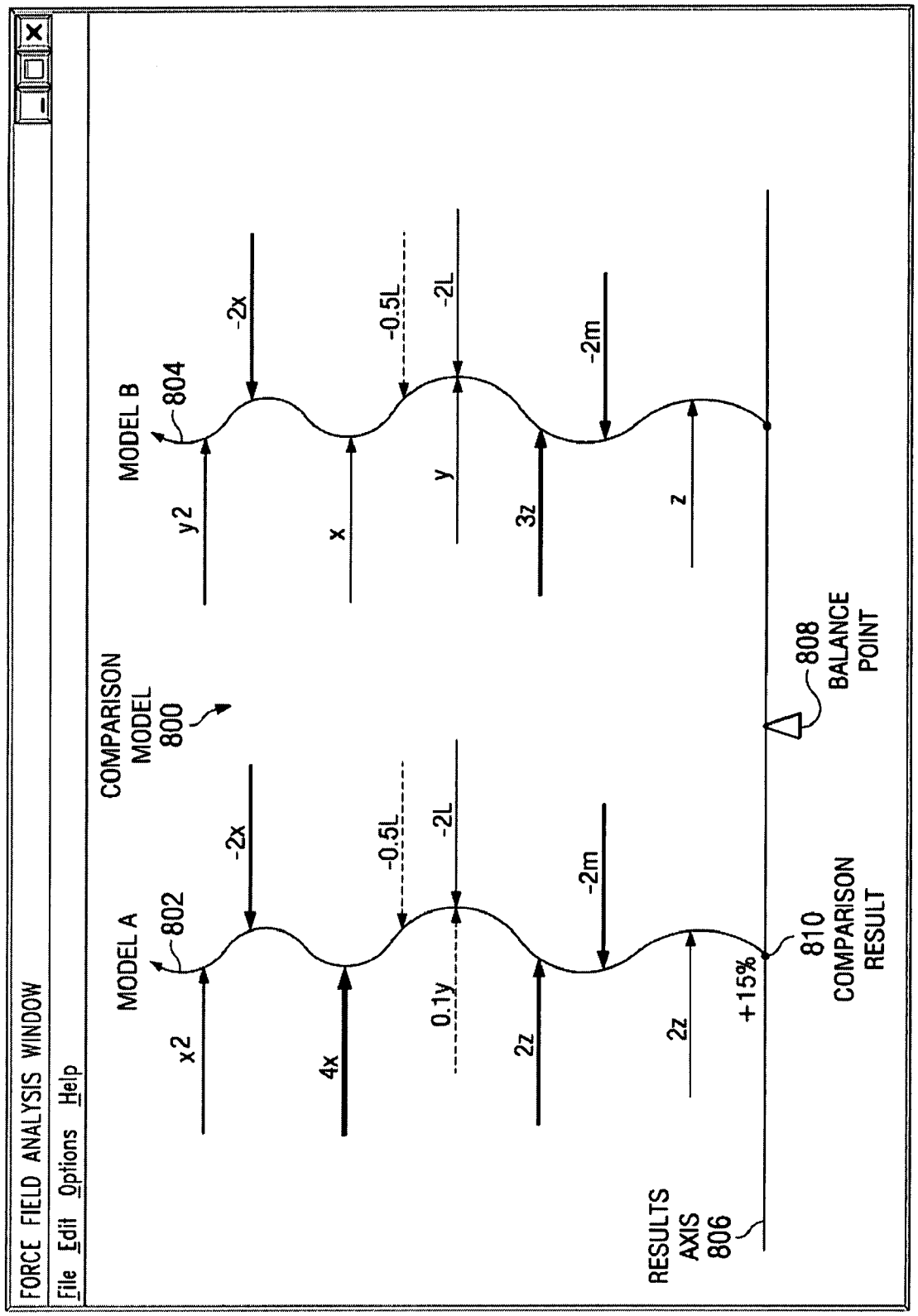
FIG. 8 is an exemplary illustration of comparing a plurality of models in accordance with an illustrative embodiment.

With reference now to FIG. 8, an exemplary illustration of comparing a plurality of models is depicted in accordance with an illustrative embodiment. Comparison model 800 is a model that a force field analysis component, such as, force calculator 110 in FIG. 1, utilizes to compare two or more models to determine, for example, which model performs the best or provides a higher likelihood of achieving a desired goal. Comparison model 800 includes model A 802, model B 804, results axis 806, and balance point 808.

Model A 802 may, for example, be model 700 in FIG. 7. Model B 804 may, for example, be a variation of model A 802. In other words, model B 804 may include variable strengths for one or more of the driving and/or restraining forces that are slightly, or vastly, different from the variable strengths in model A 802. As a result of the user altering the variable strengths between the two models, the force field analysis component is able to calculate the present value of model A 802 and the present value of model B 804 to determine which model is closer to the desired goal(s). Consequently, the force field analysis component is able to determine which model performs the best.

Results axis 806 is the axis that represents the result of the comparison of the two or more models. Balance point 808 represents a point of balance between the two or more models if the models were combined. In this illustrative example, model A 802 performs better than model B 804. Comparison result 810 indicates that model A 802 outperformed model B 804 by fifteen percent in the comparison.

Figure 9:
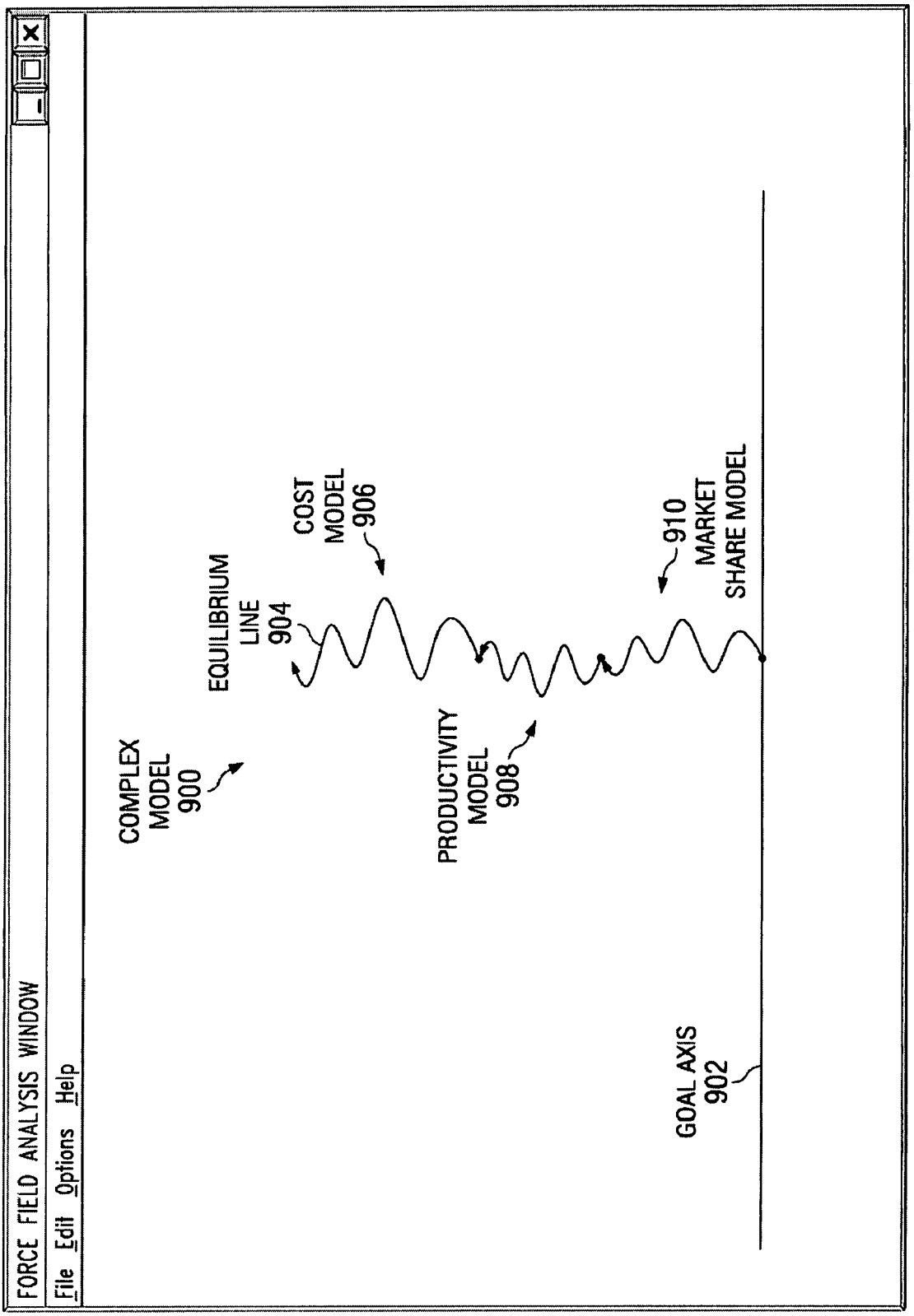
FIG. 9 is an exemplary illustration of integrating a plurality of models in accordance with an illustrative embodiment; and FIG. 10A

With reference now to FIG. 9, an exemplary illustration of integrating a plurality of models is depicted in accordance with an illustrative embodiment. Complex model 900 is a model that a force field analysis component, such as, force calculator 110 in FIG. 1, utilizes to combine two or more models to form a more complex model. For example, the force field analysis component may combine a plurality of subsystems into a single model to visually provide a more comprehensive overview of the modeled system.

Complex model 900 includes goal axis 902 and equilibrium line 904. Equilibrium line 904 includes an equilibrium line for cost model 906, productivity model 908, and market share model 910. In this illustrative example, the force field analysis component combines cost model 906, productivity model 908, and market share model 910 to form a more complex financial model.

Figure 10A:
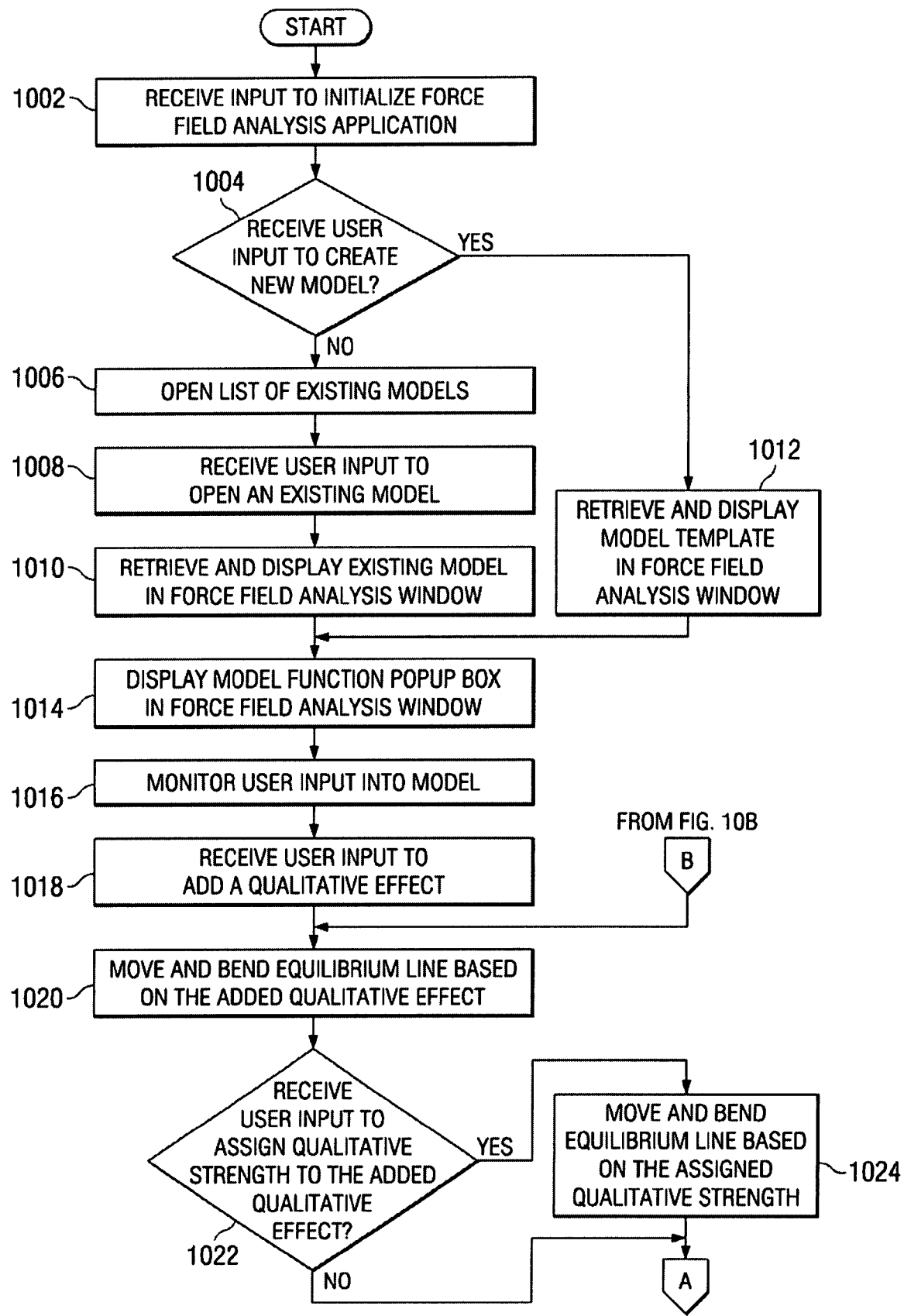
FIG. 10B is a flowchart illustrating an exemplary process for defining the effect of a plurality of forces toward one or more goals in accordance with an illustrative embodiment.
Figure 10B:
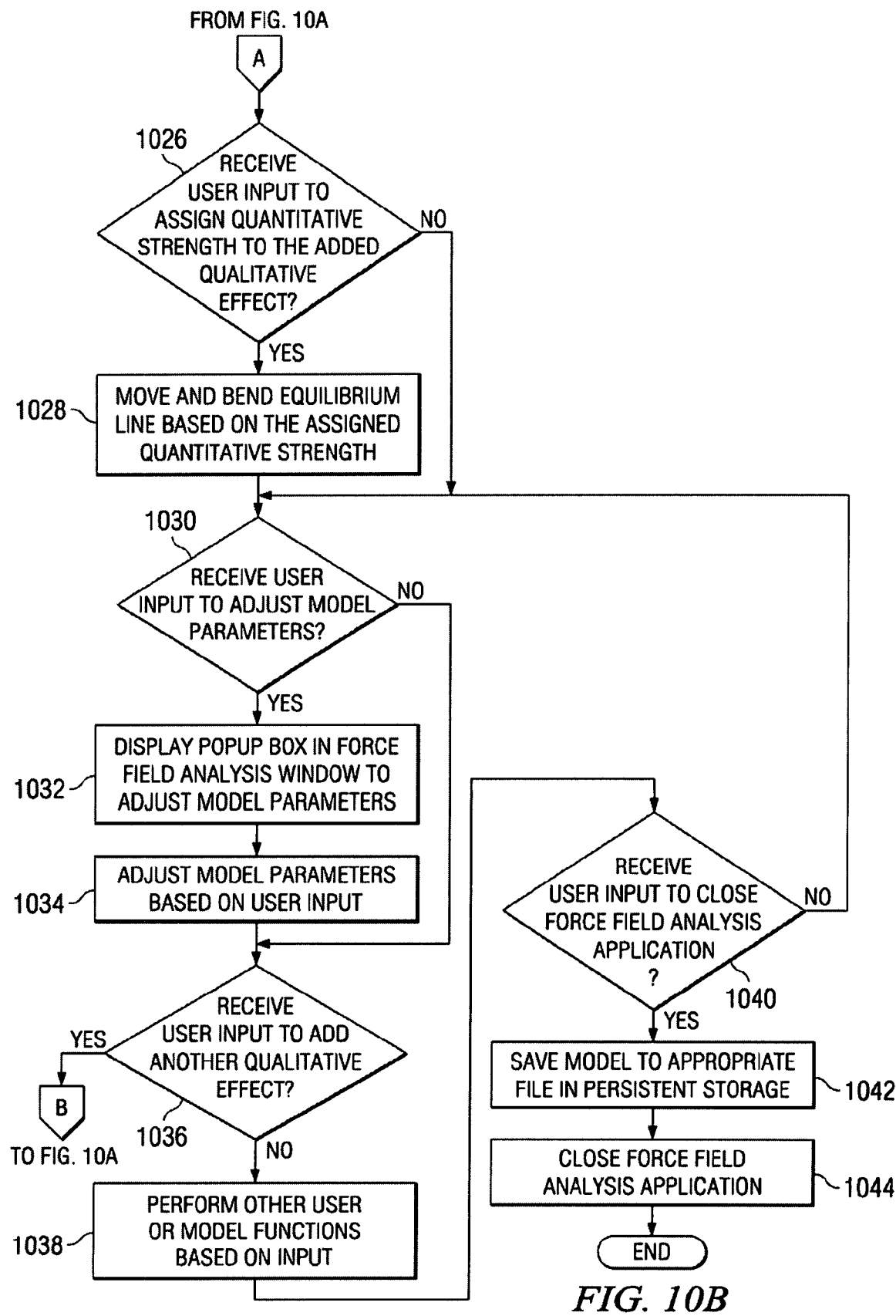

With reference now to FIG. 10A and FIG. 10B, a flowchart illustrating an exemplary process for defining the effect of a plurality of forces toward one or more goals is shown in accordance with an illustrative embodiment. The process shown in FIG. 10A and FIG. 10B may be implemented in a force field analysis component, such as, for example, force calculator 110 in FIG. 1.

The process begins when the force field analysis component receives an input to initialize a force field analysis application (step 1002). Then, the force field analysis component makes a determination as to whether the force field analysis component receives a user input to create a new model (step 1004). If the force field analysis component does not receive a user input to create a new model, no output of step 1004, then the force field analysis component opens a list of existing models (step 1006).

After opening the list of existing models in step 1006, the force field analysis component receives a user input to open an existing model (step 1008). Subsequent to receiving the user input to open the existing model in step 1008, the force field analysis component retrieves and displays the existing model, such as model 700 in FIG. 7, in a force field analysis window, such as force field analysis window 210 in FIG. 2 (step 1010). Thereafter, the process proceeds to step 1014.

Returning again to step 1004, if the force field analysis component does receive a user input to create a new model, yes output of step 1004, then the force field analysis component retrieves and displays a model template, such as model template 200 in FIG. 2, in the force field analysis window (step 1012). Then, the force field analysis component displays a model function popup box, such as function popup box 508 in FIG. 5, in the force field analysis window (step 1014) and monitors all user input into the model (step 1016).

Subsequently, the force field analysis component receives a user input to add a qualitative effect, such as force effect line 410 in FIG. 4, to an equilibrium line, such as equilibrium line 404 in FIG. 4 (step 1018). It should be noted that the force field analysis component may initially assign a default value to the qualitative effect. After receiving the user input to add the qualitative effect to the equilibrium line in step 1018, the force field analysis component automatically moves and bends the equilibrium line based on the direction and amount of force applied by the added qualitative effect (step 1020).

Then, the force field analysis component makes a determination as to whether the force field analysis component receives a user input to assign a qualitative strength to the added qualitative effect (step 1022). The user may, for example, use a popup box, such as strength popup box 510 in FIG. 5, to assign a qualitative strength, such as minor force 512, moderate force 514, strong force 516, and very strong force 518 in FIG. 5, to the added qualitative effect. If the force field analysis component does not receive a user input to assign a qualitative strength to the added qualitative effect, no output of step 1022, then the process proceeds to step 1026. If the force field analysis component does receive a user input to assign a qualitative strength to the added qualitative effect, yes output of step 1022, then the force field analysis component automatically moves and bends the equilibrium line based on the amount of force applied by the assigned qualitative strength (step 1024).

Then, the force field analysis component makes a determination as to whether the force field analysis component receives a user input to assign a quantitative strength to the added qualitative effect (step 1026). If the force field analysis component does not receive a user input to assign a quantitative strength to the added qualitative effect, no output of step 1026, then the process proceeds to step 1030. If the force field analysis component does receive a user input to assign a quantitative strength to the added qualitative effect, yes output of step 1026, then the force field analysis component automatically moves and bends the equilibrium line based on the amount of force applied by the assigned quantitative strength (step 1028).

Then, the force field analysis component makes a determination as to whether the force field analysis component receives a user input to adjust model parameters (step 1030). Model parameters may, for example, include an anticipated force that may be required to move the equilibrium line to a desired goal. In addition, model parameters may also include selection of bench mark forces from, for example, previously existing models. If the force field analysis component does not receive a user input to adjust the model parameters, no output of step 1030, then the process proceeds to step 1036. If the force field analysis component does receive a user input to adjust the model parameters, yes output of step 1030, then the force field analysis component displays a popup box in the force field analysis window for the user to adjust the model parameters (step 1032). Afterward, the force field analysis component adjusts the model parameters based on the user input (step 1034).

Then, the force field analysis component makes a determination as to whether the force field analysis component receives a user input to add another qualitative effect to the model (step 1036). If the force field analysis component does receive a user input to add another qualitative effect to the model, yes output of step 1036, then the process returns to step 1020 where the force field analysis component moves and bends the equilibrium line based on the direction and amount of force applied by the added qualitative effect. If the force field analysis component does not receive a user input to add another qualitative effect to the model, no output of step 1036, then the force field analysis component performs other user or model functions, such as model comparison and/or model integration, based on user input (step 1038).

Then, the force field analysis component makes a determination as to whether the force field analysis component receives a user input to close the force field analysis application (step 1040). If the force field analysis component does not receive a user input to close the force field analysis application, no output of step 1040, then the process returns to step 1030. If the force field analysis component does receive a user input to close the force field analysis application, yes output of step 1040, then the force field analysis component saves the model as effected by the added qualitative effects to an appropriate file in a persistent storage, such as persistent storage 108 in FIG. 1 (step 1042). Subsequent to saving the model in persistent storage in step 1042, the force field analysis component closes the force field analysis application (step 1044). The process terminates thereafter.

Thus, illustrative embodiments provide a computer implemented method, system, and computer usable program code for automatically and dynamically defining the effect of a plurality of driving and restraining forces toward one or more desired goals on a force field analysis diagram visually. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for defining the effect of forces on a model, the computer implemented method comprising:
    displaying the model, wherein the model includes a goal axis and an equilibrium line;
    calculating, by a processor using a force calculator, an amount of force and a direction of force applied to the equilibrium line of the model by added qualitative effects and a net effect of a sum of forces applied to the equilibrium line of the model by the added qualitative effects;
    bending, by the processor, the equilibrium line automatically in a positive direction and in a negative direction based on the calculated amount of force and direction of force applied to the equilibrium line by each of the added qualitative effects; and
    moving, by the processor, the equilibrium line automatically along the goal axis of the model from a current state of a modeled system to a present value of the modeled system in the positive direction toward a defined end point goal marker for the modeled system set along the goal axis or in the negative direction away from the defined end point goal marker for the modeled system set along the goal axis based on the calculated net effect of the sum of forces applied to the equilibrium line by the added qualitative effects.

2. The computer implemented method of claim 1, further comprising:
    adjusting a model parameter, wherein the model parameter is an anticipated amount of force required to achieve a defined end point goal.

3. The computer implemented method of claim 2, wherein the model parameter is generated from previously existing models to provide guidance in assigning strengths to the added qualitative effects.

4. The computer implemented method of claim 1, wherein the added qualitative effects define driving forces and restraining forces that produce an effect on the modeled system.

5. The computer implemented method of claim 1, wherein the goal axis includes at least one of a defined qualitative end point goal marker and a defined quantitative end point goal marker for the modeled system set along the goal axis.

6. The computer implemented method of claim 1, wherein the model is a force field analysis diagram of the modeled system.

7. The computer implemented method of claim 1, wherein the model is combined with one or more other models to form an integrated model that provides an overview of the modeled system.

8. The computer implemented method of claim 1, wherein the model is compared with one or more other models to determine model performance.

9. The computer implemented method of claim 1, wherein a quantitative model is automatically built by assigning a quantitative strength to one or more of the added qualitative effects.

10. The computer implemented method of claim 1, wherein the model includes a popup box that contains a plurality of different qualitative strength force indicators, and wherein a user drags and drops one of the plurality of different qualitative strength force indicators onto an added qualitative effect to apply that particular qualitative strength to the added qualitative effect.

11. The computer implemented method of claim 1, wherein the equilibrium line is dynamically bent and moved on the fly based on a continuous data feed from an external source via a network that is assigned to one or more of the added qualitative effects.

12. The computer implemented method of claim 11, wherein the force calculator monitors the continuous data feed from the external source that is assigned to the one or more of the added qualitative effects for changes and recalculates the forces applied to the equilibrium line based on the changes to the continuous data feed.

13. The computer implemented method of claim 1, wherein the model is displayed in a three dimensional format allowing rotation of the model around an x, y, and z axis based on user input.

14. The computer implemented method of claim 1, wherein a variable strength that includes a mathematical function and a mathematical sign is assigned to one or more of the added qualitative effects.

15. A data processing system for defining the effect of forces on a model, comprising:
    a bus system;
    a storage device connected to the bus system, wherein the storage device includes a set of instructions; and
    a processing unit connected to the bus system, wherein the processing unit executes the set of instructions to display the model, wherein the model includes a goal axis and an equilibrium line, calculate an amount of force and a direction of force applied to the equilibrium line of the model by added qualitative effects and a net effect of a sum of forces applied to the equilibrium line of the model by the added qualitative effects, bend the equilibrium line automatically in a positive direction and in a negative direction based on the calculated amount of force and direction of force applied to the equilibrium line by each of the added qualitative effects, and move the equilibrium line automatically along the goal axis of the model from a current state of a modeled system to a present value of the modeled system in the positive direction toward a defined end point goal marker for the modeled system set along the goal axis or in the negative direction away from the defined end point goal marker for the modeled system set along the goal axis based on the calculated net effect of the sum of forces applied to the equilibrium line by the added qualitative effects.

16. The data processing system of claim 15, wherein the processing unit executes a further set of instructions to adjust a model parameter, wherein the model parameter is an anticipated amount of force required to achieve a defined end point goal.

17. A computer program product stored on a non-transitory computer readable storage medium having computer usable program code embodied thereon that is executable by a computer for defining the effect of forces on a model, the computer program product comprising:

computer usable program code configured to display the model, wherein the model includes a goal axis and an equilibrium line;

computer usable program code configured to calculate an amount of force and a direction of force applied to the equilibrium line of the model by added qualitative effects and a net effect of a sum of forces applied to the equilibrium line of the model by the added qualitative effects;

computer usable program code configured to bend the equilibrium line automatically in a positive direction and in a negative direction based on the calculated amount of force and direction of force applied to the equilibrium line by each of the added qualitative effects; and computer usable program code configured to move the equilibrium line automatically along the goal axis of the model from a current state of a modeled system to a present value of the modeled system in the positive direction toward a defined end point goal marker for the modeled system set along the goal axis or in the negative direction away from the defined end point goal marker for the modeled system set along the goal axis based on the calculated net effect of the sum of forces applied to the equilibrium line by the added qualitative effects.

18. The computer program product of claim 17, further comprising:

computer usable program code configured to adjust a model parameter, wherein the model parameter is an anticipated amount of force required to achieve a defined end point goal.

19. The computer program product of claim 17, wherein the model is combined with one or more other models to form an integrated model that provides an overview of the modeled system.

20. The computer program product of claim 17, wherein the model is compared with one or more other models to determine model performance.

* * * * *